F. L. RAPSON.
RESILIENT WHEEL FOR VEHICLES.
APPLICATION FILED MAR. 1, 1921.

1,413,190.

Patented Apr. 18, 1922.

INVENTOR.
F. L. Rapson,
BY
ATTORNEY.

UNITED STATES PATENT OFFICE.

FREDERICK LIONEL RAPSON, OF LIVERPOOL, ENGLAND.

RESILIENT WHEEL FOR VEHICLES.

1,413,190.          Specification of Letters Patent.     Patented Apr. 18, 1922.

Application filed March 1, 1921. Serial No. 448,919.

(GRANTED UNDER THE PROVISIONS OF THE ACT OF MARCH 3, 1921, 41 STAT. L., 1313.)

*To all whom it may concern:*

Be it known that I, FREDERICK LIONEL RAPSON, a subject of His Majesty the King of England, and resident of Liverpool, in the county of Lancaster, Kingdom of England, have invented certain new and useful Improvements in or Relating to Resilient Wheels for Vehicles, (for which an application for patent was filed in Great Britain, dated January 22nd, 1919, and numbered 142,045,) of which the following is a specification.

This invention relates to resilient wheels for vehicles and particularly to the outer covers of tyres for resilient wheels.

The object of this invention is to so form the outer cover that when the tread is under compression a substantially flat surface will rest on the road to prevent skidding or rolling.

According to this invention the tread of a tyre is formed with projections or tread blocks by the provision of crossing or intersecting grooves or recesses of undercut formation, so that the adjacent outer edges of the blocks will touch one another when in contact with the road surface.

The invention will now be described with reference to the accompanying drawings, in which :—

Figure 1:
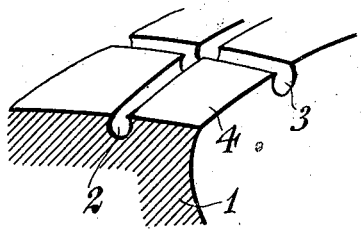
Figure 1 is a sectional perspective view of part of a tread of an outer cover constructed according to this invention.

As shown more particularly in Figure 1, the tread portion of an outer cover 1 is formed with circumferential grooves 2 and transverse grooves 3 to provide a number of upstanding projections or tread blocks 4. These tread blocks 4 are of square, oblong or rectangular shape. The circumferential grooves 2 and the transverse grooves 3 may be of various shapes in cross section, but they are undercut and may be concaved or curved in shape to permit the adjacent outer edges 5 of the blocks 4 to touch one another when in contact with the road surface.

Figure 3:
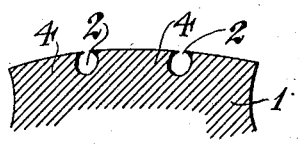
Figure 3 is a cross section on the line 3—3 of Figure 2.
Figure 2:
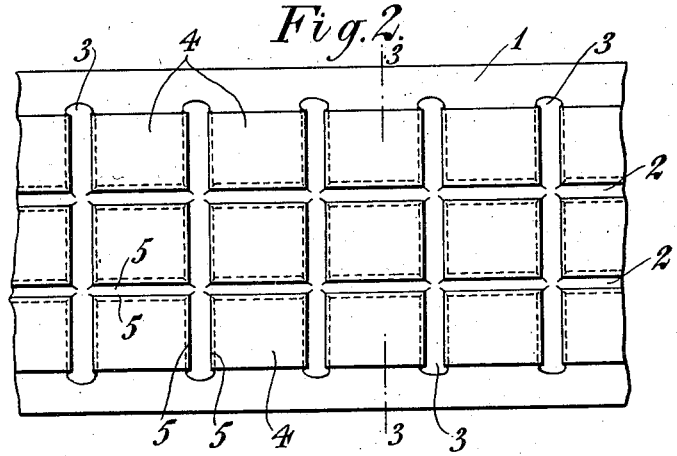
Figure 2 is a plan of an outer cover tread for a single tube tyre.
Figure 4:
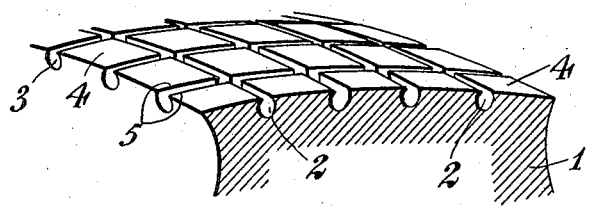
Figure 4 is a sectional perspective view of part of an outer cover for a twin tube tyre.

In a single tube tyre as shown in Figures 2 and 3, I preferably arrange three circumferential rows of blocks 4 on the tread and in a double tube tyre, as shown in Figure 4, I arrange five rows of blocks 4. It will be understood that any number of square and/or oblong shaped blocks may be arranged across the tread of the tyre, but the width of the tread portion of the tyre is preferably substantially equal to the distance across the wheel rim.

This application is a continuation in part of my application filed September 16, 1919, Serial Number 324,082.

What I claim is:—

1. A resilient tire having its tread provided with outstanding tread blocks formed by intersecting undercut grooves, the edges of which contact when subjected to pressure.

2. A resilient tire having its tread provided with outstanding tread blocks formed by intersecting concave grooves, the edges of which contact when subjected to pressure.

In testimony whereof I have hereunto signed my name.

FRED LIONEL RAPSON.